United States Patent [19]

Harrison et al.

[11] Patent Number: 5,103,634
[45] Date of Patent: Apr. 14, 1992

[54] THRUST REVERSING SYSTEM AND METHOD

[75] Inventors: Geoffrey E. Harrison, Kirkland; Robert B. Brown, Renton, both of Wash.

[73] Assignee: The Boeing Company, Seattle, Wash.

[21] Appl. No.: 448,020

[22] Filed: Dec. 8, 1989

Related U.S. Application Data

[63] Continuation-in-part of Ser. No. 205,184, Jun. 10, 1988, Pat. No. 4,922,711.

[51] Int. Cl.⁵ .......................... F02K 3/02; F02K 1/00
[52] U.S. Cl. .................................. 60/204; 60/226.2; 60/228; 60/232; 239/265.33; 244/23 D; 244/12.5
[58] Field of Search ............ 60/204, 228, 226.2, 60/229, 232, 230, 39.31; 239/265.33, 265.19, 265.25, 265.27, 265.29; 244/110 B, 54, 23 D, 12.5

[56] References Cited

U.S. PATENT DOCUMENTS

| | | |
|---|---|---|
| 3,599,874 | 8/1971 | Hom et al. .................. 239/265.29 |
| 3,640,468 | 2/1972 | Searle et al. .................. 235/265.29 |
| 3,792,587 | 2/1974 | Kappus et al. .................. 60/229 |
| 3,979,067 | 9/1976 | Nash .................. 244/12.5 |
| 4,175,385 | 11/1979 | Nash .................. 244/12.5 |
| 4,222,234 | 9/1980 | Adamson .................. 60/230 |

Primary Examiner—Louis J. Casaregola
Assistant Examiner—John A. Savio, III
Attorney, Agent, or Firm—Hughes & Multer

[57] ABSTRACT

An engine end and thrust reversing assembly comprising an annular thrust diverting structure which in the cruise configuration is a rearward extension of a fan duct cowl structure. For thrust reversal, the thrust diverting structure is swung rearwardly and inwardly about an inboard hinge axis to form a laterally and forwardly directed thrust reversing opening. A transversely curved blocking plate is pivotally mounted about a vertical axis to the fan duct structure, and in the cruise configuration it is positioned adjacent to a forward extension of the thrust diverting structure so as to surround a portion of the exhaust passageway. In the thrust reversing position, the blocking plate is swung to a position where it extends across the exhaust passageway defined by the thrust diverting structure.

33 Claims, 6 Drawing Sheets

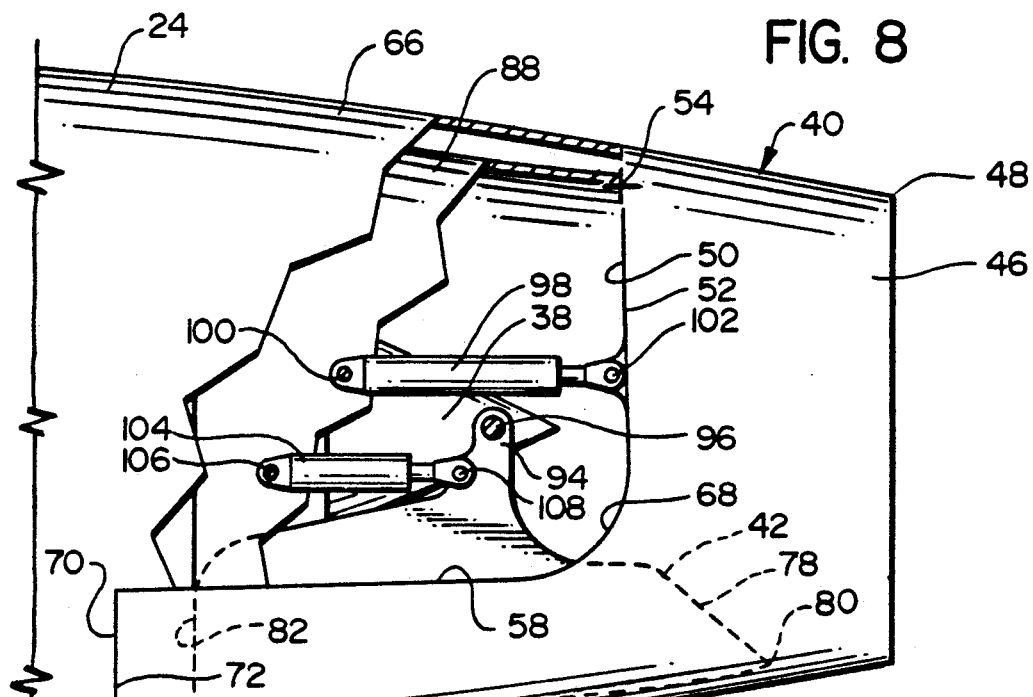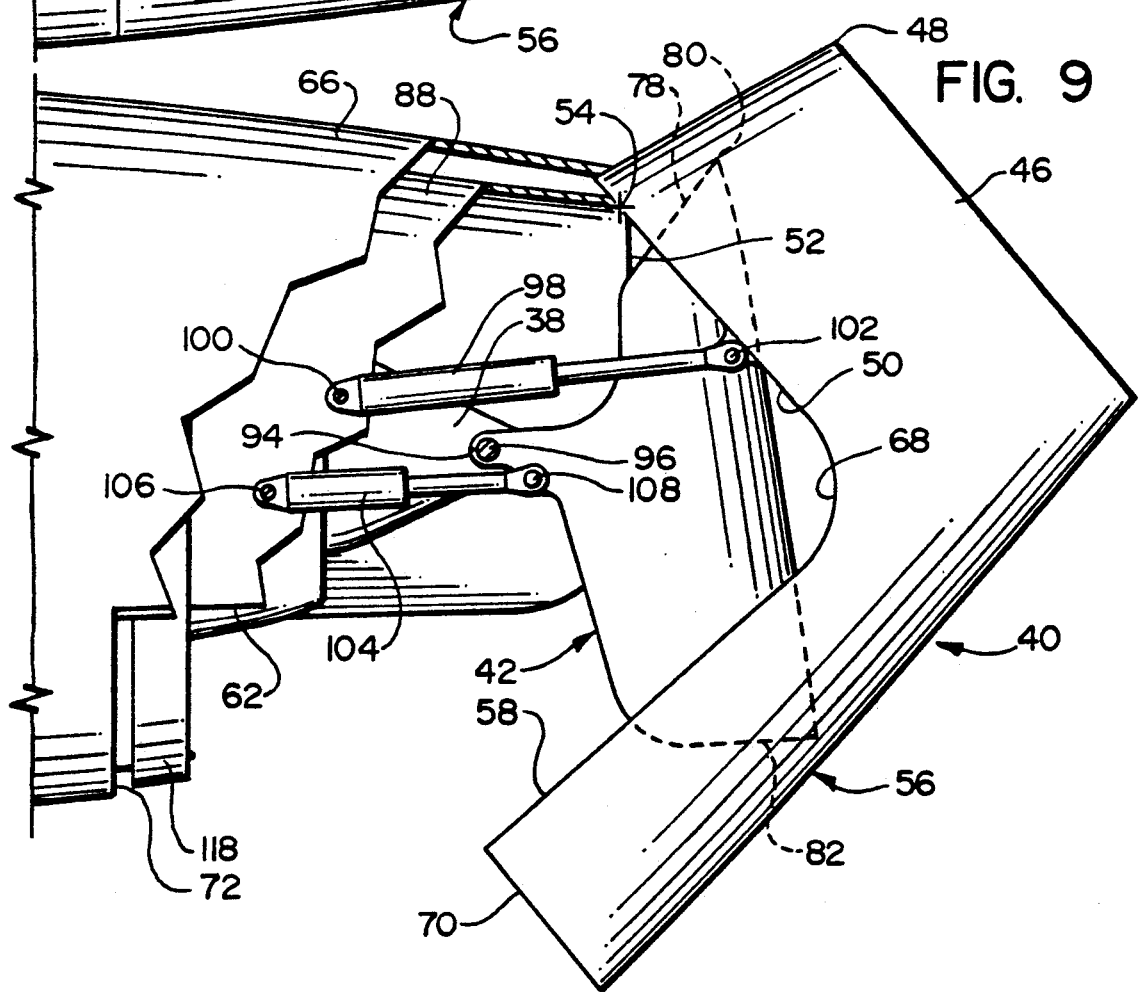

THRUST REVERSING SYSTEM AND METHOD

CROSS REFERENCE TO RELATED APPLICATIONS

The present application is a continuation-in-part application of U.S. Patent Application Ser. No. 07/205,184 filed June 10, 1988, now U.S. Pat. No. 4,922,711 entitled "Thrust Reversing System for High Bypass Fan Engines", naming Robert B. Brown as the applicant.

BACKGROUND OF THE INVENTION

1. Field of the Invention

The present invention relates to a thrust reversing system for an aircraft, and more particularly to such a thrust reversing system particularly adapted for use with high bypass long duct fan engines.

2. Background Art

The design of effective thrust reversers has been a problem in the aircraft industry for a number of decades. Ideally, in the stowed configuration for cruise, the thrust reversing mechanism should be located so as to minimize any drag and also so as not to interfere with the operating components of the engine. This requirement is oftentimes incompatible with the need to provide effective reverse flow of the engine exhaust. The result is often a compromise between these two requirements.

A search of the patent literature directed toward the subject matter of the parent application of the present application disclosed a number of patents, and these are recited below.

U.S. Pat. No. 3,262,271 (Beavers) shows a thrust reverser for a fan jet engine which reverses only the fan flow. There are a plurality of isosceles-shaped flaps 22 which pivot from the fan cowl into the blocking position. This fan cowl section 19 moves rearwardly to expose vanes 38. The core exhaust is not reversed, and the exhaust appears to be uniformly reversed around the entire periphery of fan area.

U.S. Pat. No. 3,279,182 (Helmintoller) shows a thrust reversing system which is similar in principle to the Beavers patent discussed immediately above.

U.S. Pat. No. 3,483,702 (Ward) shows a thrust reverser having the same basic operating principles as the two patents noted immediately above (i.e., Beavers and Helmintoller). There are inner and outer flaps 26 and 25 which move to cause the thrust reversal, and there are guide vanes 44 that are attached to piston rods 40.

U.S. Pat. No. 3,600,394 (McClain) shows a thrust reverser operating to reverse the fan jet in accordance with the same operating principles as the three patents discussed immediately above. The doors 50 are pivotally mounted at 54 and are moved to the blocking position as section 28 moves rearwardly.

U.S. Pat. No. 3,608,314 (Colley) is another example of a thrust reverser having the same operating principles as the four discussed above. The reversing flaps 28 comprise the flap sections 30 and 32, and the aft section of the cowl moves rearwardly to uncover the vanes.

U.S. Pat. No. 3,660,982 (Goslan) shows a variety of thrust reversing arrangement somewhat schematically. In FIGS. 7 and 8, and also in FIGS. 13 and 14, there are shown reversing mechanisms that deflect the thrust upwardly only. The patent is directed toward deflector plates positioned in the thrust reverser to prevent backflow into the bypass passageway.

U.S. Pat. No. 3,691,771 (Colley) discloses a thrust reverser where a plurality of blocker flaps 32 pivot radially inwardly to block the fan duct passageway of a fan duct engine, with the flow being deflected radially outwardly through the vanes 56 in a forward direction. (This arrangement is similar to the first five patents noted above.)

U.S. Pat. No. 3,779,010 (Chamay et al.) shows a thrust reverser where the aft section of the engine translates rearwardly to uncover a plurality of guide vanes which extend around the nozzle of the engine. This also causes a plurality of blocker flaps 70, which are pivotally mounted to the translating portion of the cowling, to move inwardly to a blocking position. A number of struts 86 interconnect the blocker flaps 70 with the engine casing 20. It is stated that this casing 20 could either house a conventional core engine, or it could be the plug of a core engine.

U.S. Pat. No. 3,844,482 (Stearns) shows a clam shell thrust reverser for an engine which is shown mounted directly to the wing. The clam shell panel 26 is pivotally mounted about a lower axis and rotates rearwardly and upwardly into its blocking position. An aft ramp segment 54 is pivotally mounted at a forward location at 48 and is rotated upwardly to block the rear opening of the clam shell panel 26 so that the exhaust flows into the clam shell panel 26 and is deflected forwardly and upwardly for thrust reversal.

U.S. Pat. No. 3,915,415 (Pazmany) shows a thrust reverser used on a wing mounted jet engine where the exhaust gases are discharged over the upper surface of the wing. The nacelle has an aft section 24 with a target blocker door 28 which is moved rearwardly and downwardly onto the upper surface of the wing into its thrust reversing position. A set of vanes is moved rearwardly toward the upper edge of the blocker door to deflect the exhaust gases upwardly and forwardly.

U.S. Pat. No. 3,917,198 (Sanders) shows a thrust reverser for a jet engine mounted to a wing where the exhaust gases are discharged over the upper surface of the wing. There is a deflector door 24 positioned at the aft end of the engine, and this is rotated upwardly and rearwardly to its thrust reversing position. The blocker door 22 has its forward edge moved rearwardly which, in turn, by the action of the linkage 48 moves the blocker door 22 upwardly into its blocking position to cooperate with the deflector door 24 to cause upward and forward deflection of the jet exhaust.

U.S. Pat. No. 3,981,463 (pazmany) shows another thrust reverser for use in an engine mounted directly to a wing so as to discharge its exhaust over the upper surface of the wing. There is a blocker door 20 which is pivotally mounted at its forward end of the upper surface of the wing for movement upwardly and forwardly to its blocking position. A deflector door 30 is pivotally mounted at its rear end and movable upwardly and rearwardly to its thrust reversing position.

U.S. Pat. No. 4,073,440 (Hapke) shows a thrust reverser to reverse the thrust of both the primary and fan air. In some embodiments, blocker doors are arranged to be moved from a stowed position adjacent the inner circumferential wall defining the inside of the fan duct radially outwardly to a thrust reversal position, with the air flow through the fan duct being diverted radially outwardly through cascade vanes which are exposed by rearwardly translating an aft portion of the nacelle rearwardly. In some arrangements, blocker doors are also provided to move to a developed position to divert the flow from the primary exhaust radially outwardly through cascade vanes, and in other arrangements, the primary flow is closed off, thus permitting the primary exhaust to exit through the nozzle through which the fan air is normally discharged.

U.S. Pat. No. 4,183,478 (Rudolph) shows a thrust reverser where in one embodiment there is a single clam shell door used in an engine which is mounted to the wing, with the exhaust being directed over the top surface of the wing. The door is slide mounted at a forward location, and is mounted by a pivot link at a rear location, this causing the door to have a rearward and angular movement to its thrust reversing position. Movement of the door exposes a set of cascade vanes. In another embodiment, two such clam shell door are shown in an axisymmetric exhaust system.

Also, in the prosecution of the parent application, a number of patents were cited, these being the following:

U.S. Pat. No. 3,704,829 (Hall et al.) discloses a vectoring nozzle for a jet engine where there is a plurality of segments, each being spherically curved. These are movable from a nested position at the exhaust end of the engine and can be deployed to define a surface which curves rearwardly in a 90° arc to deflect the exhaust gases.

U.S. Pat. No. 3,835,643 (DeGarcia, Jr. et al.) shows a vectoring nozzle arrangement similar to that disclosed in the Hall et al. patent noted immediately above.

U.S. Pat. No. 3,837,411 (Nash et al.) shows a thrust diverter for a jet engine where there is a pair a blocker doors having a stowed position where they are diametrically opposed and positioned adjacent to the duct wall so as to close openings in the duct wall The blocker doors can be swung rearwardly toward a blocking position so as to block the flow of gaseous exhaust and divert the gaseous exhaust outwardly through the side openings.

U.S. Pat. No. 4,000,612 (Wakeman et al.) discloses a vectoring nozzle which has a configuration similar to two of the patents noted above, namely, U.S. Pat. No. 3,704,829 (Hall) and U.S. Pat. No. 3,835,643 (DeGarcia, Jr. et al.). This patent is related to a cooling system for the apparatus.

U.S. Pat. No. 4,026,105 (James) shows a thrust reverser for a fan jet engine where blocking elements are mounted in the outer fan duct structure and move rearwardly and radially inwardly to block the flow and also expose cascades to direct the exhaust flow for thrust reversal.

U.S. Pat. No. 4,216,926 (Lawson) discloses a thrust reversing system operating on the same principle as the thrust reverser in the patent noted immediately above, namely, U.S. Pat. No. 4,026,105 (James).

U.S. Pat. No. 4,731,991 (Newton) shows a thrust reversing system which operates on the same general principle as U.S. Pat. No. 4,026,105 (James) and U.S. Pat. No. 4,216,926 (Lawson). This patent discloses a plurality of deflector vanes which in the stowed position are stacked against one another and which move away from one another in the thrust deflecting position so as to provide deflecting passageways.

U.S. Pat. No. 4,801,112 (Fournier et al.) shows a thrust reverser where the blocker doors which are positioned in the fan cowl move to their thrust reversing position so that a portion of the doors extend radially inwardly to perform the blocking function, and a radially outward portion of the doors extend outwardly from the fan cowl.

SUMMARY OF THE INVENTION

The present invention comprises a jet engine and thrust reversing assembly which has a longitudinal axis, a forward end and a rear end. This assembly comprises an engine comprising an engine housing that encloses a thrust creating engine portion. The engine has an intake end and an annular rear end portion from which exhaust is discharged into an exhaust area.

There is a thrust reversing subassembly which comprises an annular thrust diverting structure and a blocking plate means. The thrust diverting structure has a cruise position and a thrust reversing position. This thrust reversing structure comprises an circumferential side wall which in the cruise position extends substantially entirely around the exhaust area. A forward portion of the thrust diverting structure is positioned adjacent to the rear end portion of the housing so as to form a rearward extension of the housing and to define a rear exhaust passageway portion from which the exhaust is discharged. The thrust diverting structure is pivotally movable about a pivot location from the cruise position to the thrust reversing position where a portion of the forward portion of the thrust diverting structure is spaced radially from the rear end portion of the housing to form a transversely directed thrust diverting opening.

The blocking plate means in the cruise position is positioned adjacent to at least a portion of the circumferential side wall so as to extend around at least a part of said exhaust passageway. In the thrust reversing position the blocking plate means is positioned to block flow through the rear exhaust passageway portion to create with the thrust diverting structure a flow diverting region to cause the exhaust to flow through the thrust diverting opening to create a reverse thrust.

There is actuating means to move the thrust diverting structure and the blocking plate means between the cruise position and the thrust reversing position.

In the preferred configuration, the blocking plate means has a first edge portion which, when the plate means is moving from the cruise position to the thrust reversing position moves from a location adjacent to one side of the thrust diverting structure to an opposite side of the thrust reversing structure. In the cruise configuration, the first edge portion is a rear edge portion of the plate means. Further, the plate means has a forward edge portion which in the thrust reversing position is positioned adjacent to the thrust diverting structure at a location opposite to the aforementioned opposite side of the thrust reversing structure to which the first edge portion is adjacent in the thrust reversing position.

In the preferred configuration, the thrust diverting structure comprises a main rear end portion which is annular, and a forward extension portion which extends forwardly from the main rear end portion and in the thrust reversing position extends in a lateral and forward direction to direct the exhaust in a lateral and forward direction. The plate means is in the preferred form pivotally mounted to the assembly, and more the jet engine. In the particular embodiment shown herein, the engine is a long duct fan engine having a fan duct structure, with the thrust diverting structure being a rearward extension of the fan duct structure. The thrust loads exerted on the thrust diverting structure and the blocking plate means are transmitted through load varying apparatus in the fan duct structure.

In the method of the present invention, the assembly is provided as described above. The thrust diverting structure and the blocking plate means are moved from the cruise position to the thrust reversing position in the manner described above.

Other features of the present invention will become apparent from the following detailed description.

BRIEF DESCRIPTION OF THE DRAWINGS

FIG. 8 is a top elevational view of the rear portion of the engine and the thrust reverser, with portions of the cowling structure being broken away for purposes of illustration, showing the thrust reverser in the stowed position FIG. 9 is a view similar to FIG. 8, showing the thrust reverser in its deployed position.

DESCRIPTION OF THE PREFERRED EMBODIMENT

Figure 4:
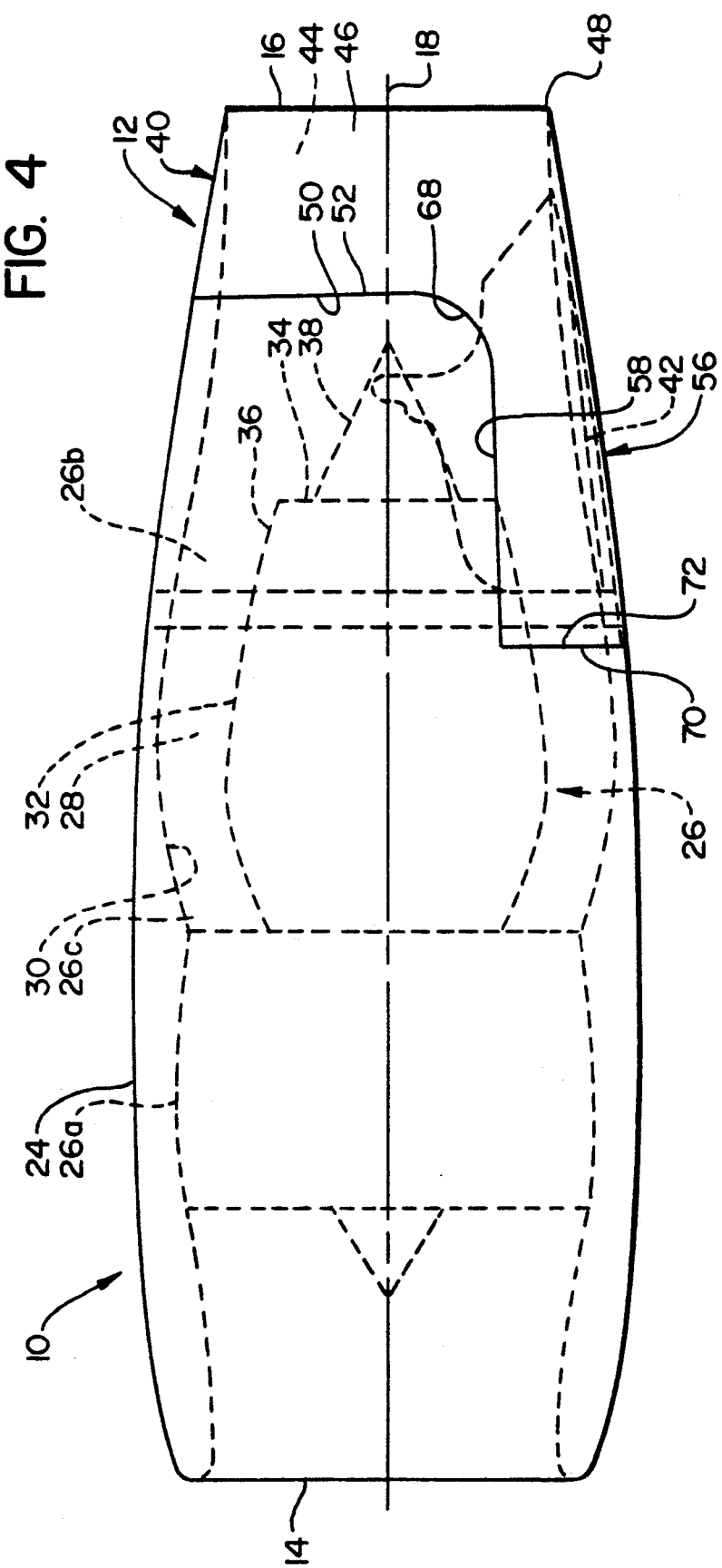
FIG. 4 is a top plan view of the engine incorporating the thrust reverser, with the mounting strut not being shown, and with the main components of the engine being shown in broken lines.
Figure 5:
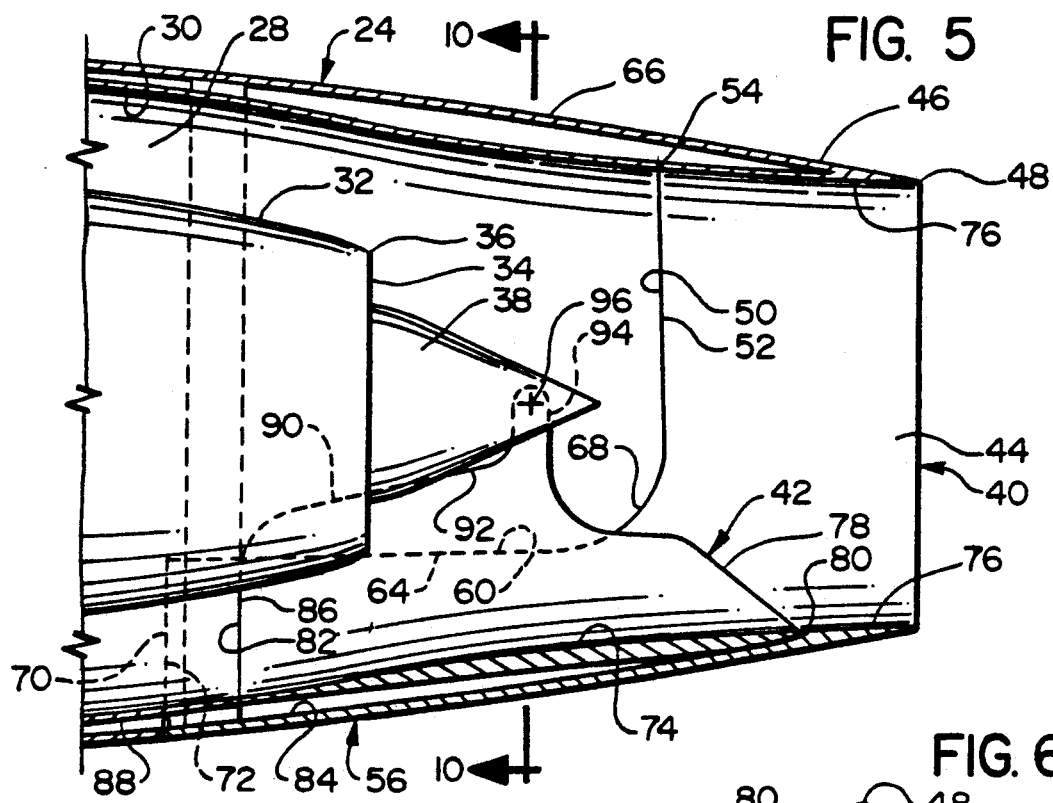
FIG. 5 is a longitudinal sectional view taken along a horizontal plane passing through the center axis of the engine, showing the rear portion of the engine and the thrust reverser in its stowed position for cruise.

The engine 10 incorporating the thrust reversing system 12 of the present invention is, in this preferred embodiment, a long duct fan engine having a front inlet 14, and rear exhaust end 16, and a longitudinal center axis 18 (see FIG. 4). In the particular arrangement shown herein, the engine 10 is mounted beneath, and forwardly of, a wing 20 by means of a mounting strut 22 positioned directly above the engine 10.

As can be seen in FIG. 4, the engine 10 comprises an outer nacelle structure or fan duct structure 24 and a core engine 26. This core engine is, or may be, in and of itself of conventional design, comprising a forward compressor section 26a, a rear turbine section 26b, and an intermediate gas generating section 26c. The fan (not shown for ease of illustration) is mounted within the forward end of the fan duct structure 24, with the fan exhaust being discharged through an annular fan passageway 28, defined by the inner surface 30 of the fan duct structure 24 and the outer surface 32 of the core engine 26. The core engine 26 has an annular exhaust passageway 34 defined by a peripheral exhaust nozzle 36 and an end plug 38.

The thrust reversing assembly 12 of the present invention comprises two main components, namely an end thrust diverting structure 40 and a blocking plate 42. The thrust reversing assembly 12 has a cruise position, illustrated in FIGS. 2, 4, 5 and 8, and a thrust reversing position shown in FIGS. 3, 6 and 9.

In the cruise configuration, the end structure 40 is a rearward extension of the outer nacelle structure 24, and the blocking plate 42 is positioned adjacent to and within the end structure 40 so as to also to be configured and positioned as a rearward extension of the outer nacelle structure 24. Thus, in the cruise configuration the end structure 40 and the blocking plate 42 define an exhaust passageway 44 through which the bypass air from the fan passageway 28 and the exhaust from the core engine 26 are exhausted.

The end structure comprises a main rear end portion 46 which has an annular configuration with a circumferential rear edge 48 that defines the extreme rear end of the exhaust passageway 44. Also, the main rear end portion 46 has a forward edge 50 which extends in a curve moderately greater than a semi-circle in a plane which is generally perpendicular to the longitudinal axis 18. In the cruise configuration, this forward edge 50 of the rear end portion 46 fits against a matching rear edge portion 52 of the fan duct structure 24. As can be seen in the plan views of FIG. 5 and FIG. 6, the main rear edge portion 46 of the end structure 40 is hinge mounted at 54 to an inboard part of the rear edge portion 52 of the fan duct structure 24, so that the end structure 40 is able to rotate from the cruise configuration of FIG. 5 rearwardly in an inboard direction to the thrust reversing position of FIG. 6.

Figure 1:
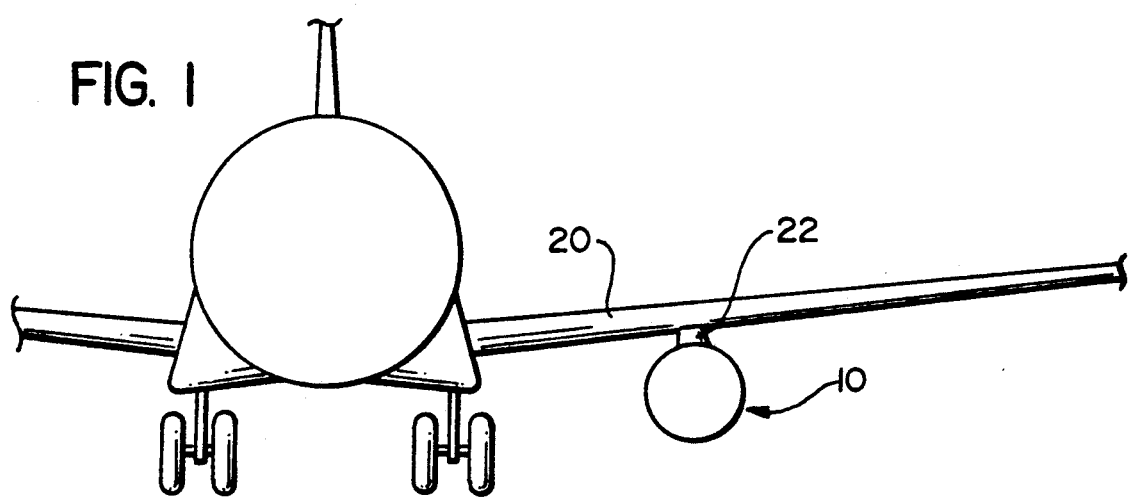
FIG. 1 is a front elevational view of an aircraft incorporating the thrust reversing system of the present invention.
Figure 2:
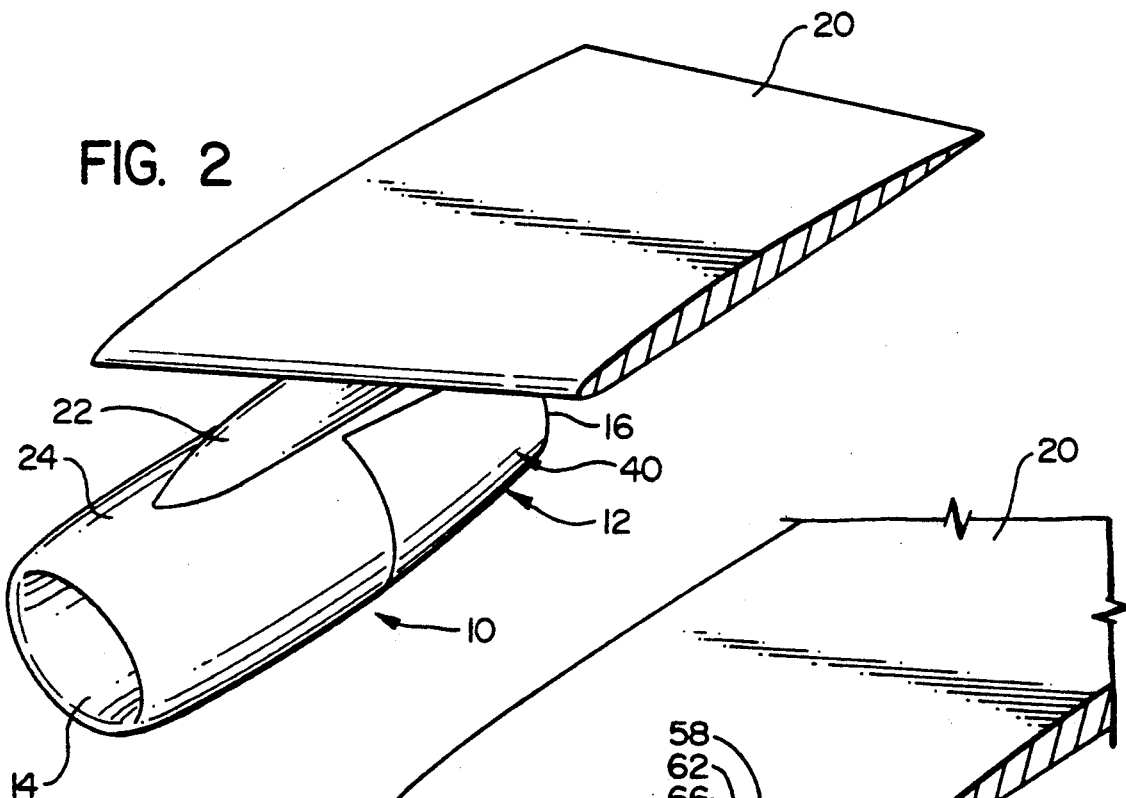
FIG. 2 is an isometric view looking downwardly and rearwardly in an inboard direction toward a portion of the wing of the aircraft and one engine, with the thrust reversing apparatus in its stowed cruise configuration.
Figure 3:
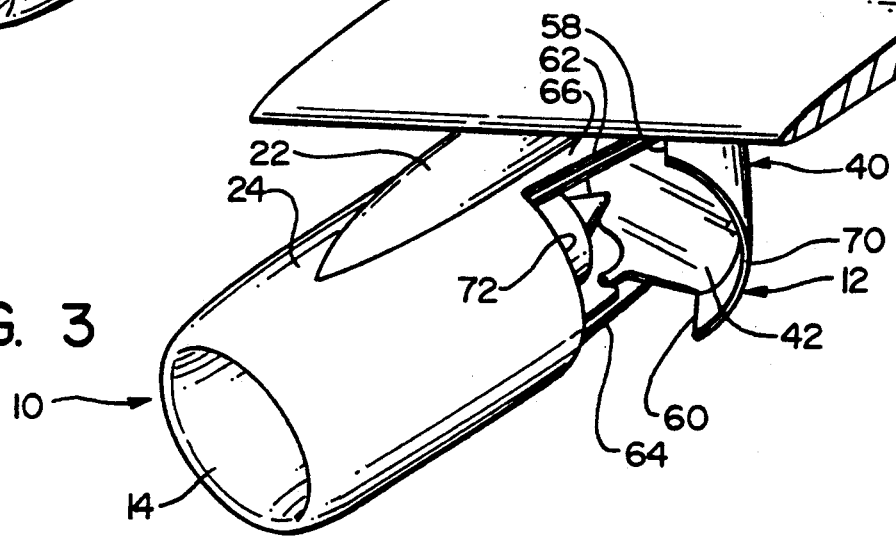
FIG. 3 is a view similar to FIG. 2, with the thrust reverser in its deployed position.
Figure 10:
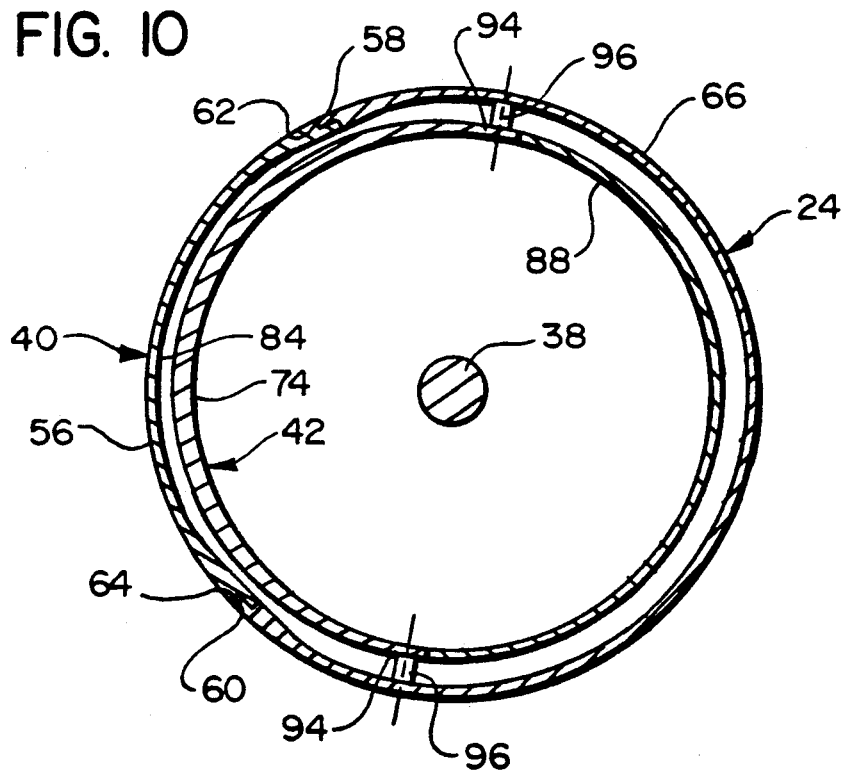
FIG. 10 is a sectional view taken along line 10-10 of FIG. 5.

The end structure 40 also comprises a forward extension 56 which extends forwardly from an outboard portion of the main rear end portion 46 so as to be positioned at a diametrically opposed location relative to the hinge mounting 54. As can be seen in FIGS. 3 and 10, the forward extension 56 curves in a generally circular curve (relative to a plane transverse to a forward to rear axis of the extension 56), so as to match the contour of the current outer surface of the fan duct structure 24.

More particularly, the forward extension 56 has longitudinally extending upper and lower edges 58 and 60 which in the cruise configuration fit against upper and lower edges 62 and 64 of an outer skin 66 of the fan duct structure 24. These two edges 58 and 60 extend rearwardly into curved joining edge portions 68 which curve upwardly and rearwardly to join to the aforementioned forward edges 50 of the main rear end portion 46. The forward extension 56 has a forward edge 70 which curves in a transverse plane and in the cruise configuration fits against a matching rear edge 72 of the outer skin 66 of the fan duct structure 24. It can readily be seen that the edges 52, 62 and 64 form a contour which matches with the edges 50, 58, 60 and 68 so that in the cruise configuration these fit against one another to make continuous surfaces.

The aforementioned blocking plate 42 has, relative to a section taken transversely along a lengthwise axis of the blocking plate 42, a curved configuration (see FIG. 10) following generally a curve of a portion of a cylinder in a manner that in the cruise configuration, the inside surface 74 of the forward extension 56 forms a rearward extension of an outboard portion of the inner surface 30 of the fan duct structure 24, and also blends into an outboard portion of the inside surface 76 of the rear end portion 46 of the end structure 40. The rear edge 78 of the blocking plate 42 is contoured in a curve lying in a plane which in the cruise position of the blocking plate 74 slants from a rearmost middle edge portion 80 in a plane which extends forwardly in an inboard direction when in the cruise configuration. As will be described more fully hereinafter, the reason for this is that when the blocking plate 42 and the end structure 40 are in the thrust reversing position of FIG. 6, the edge 78 fits closely adjacent to the inside surface 76 of the main rear end portion 46 of the end structure 40.

Figure 6:
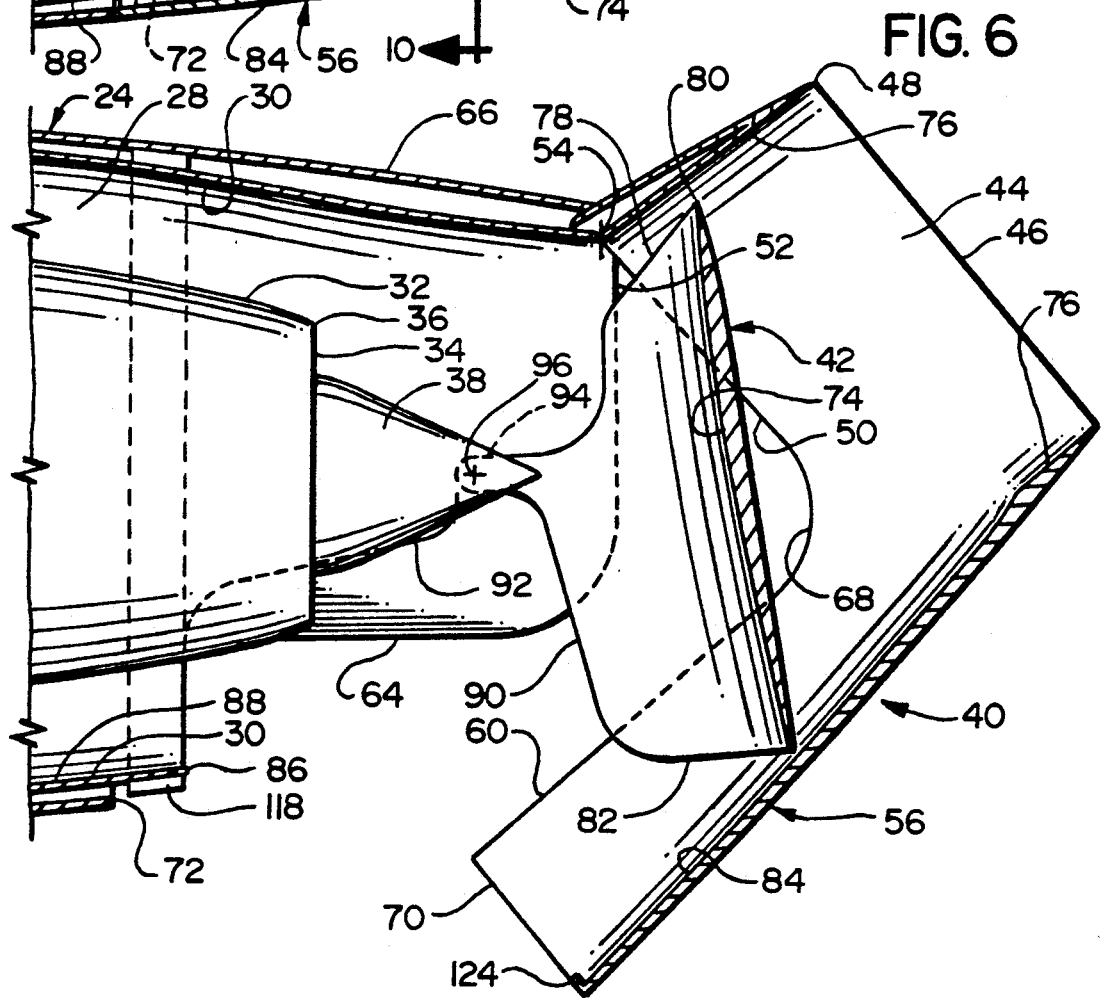
FIG. 6 is a view similar to FIG. 5, but showing the thrust reverser in its deployed position.

The forward edge 82 of the blocking plate 42 extends in a curve and is contoured so that in the deployed position of FIG. 6, this edge 82 is positioned in reasonably close proximity to the inside surface 84 of the forward extension 56 of the end structure 40. The deflecting action of end structure 40 and blocking plate 42 is such that it is not necessary that the forward edge 82 have a close fit with the surface 84, however. In the stowed position, the forward edge 82 of the blocking plate 42 fits against a rearwardly facing edge portion 86 of an inner skin 88 of the fan duct structure 24. Longitudinally extending forward edge portions 90 of the blocking plate 42 fit, in the stowed position, against matching edge portions 92 of the inside skin 88. The two side portions of the blocking plate 82 have, at about the mid-length thereof, two ears 94 which are positioned adjacent to the fan duct structure 24 and are pivotally mounted thereto at 96 for rotation about a vertical axis transverse to the longitudinal axis 18.

To move the end structure 40 between its cruise and thrust reversing position, there is provided a pair of actuators 98 in the form of hydraulic jacks, each having a forward pivot connection 100 to the fan structure 24 and rear pivot connection 102 to the rear end portion 46 of the end structure 40. (See FIGS. 8 and 9.) The two actuators 98 are on opposite sides of the fan duct structure 24 and positioned between the inner skin 88 and outer skin 66 of the fan duct structure 24. To move the blocking plate 42 between its cruise and thrust reversing positions, there is provided a second pair of actuators 104 (as shown herein hydraulic actuators) each having a forward pivot connection 106 to the fan duct structure 24 and a rear pivot connection 108 spaced from the axis of the pivot connections 96 of the blocking plate 42.

It is readily apparent from viewing FIGS. 8 and 9 that the actuators 98 and 104 are retracted to place the end structure 40 and the blocking plate 42 in the stowed configuration of FIG. 8, and extended to deploy the end structure 40 and the blocking plate 42 to the thrust reversing position of FIG. 9. It is also apparent that the action of the actuators 98 and 104 must be coordinated so that the end structure 40 must begin its movement away from the stowed configuration of FIG. 8 to permit the blocking plate 42 to begin its movement toward the deployed thrust reversing position of FIG. 9. These actuators 98 and 104 are shown somewhat schematically and their locations could be optimized to provide appropriate load paths.

Figure 7:
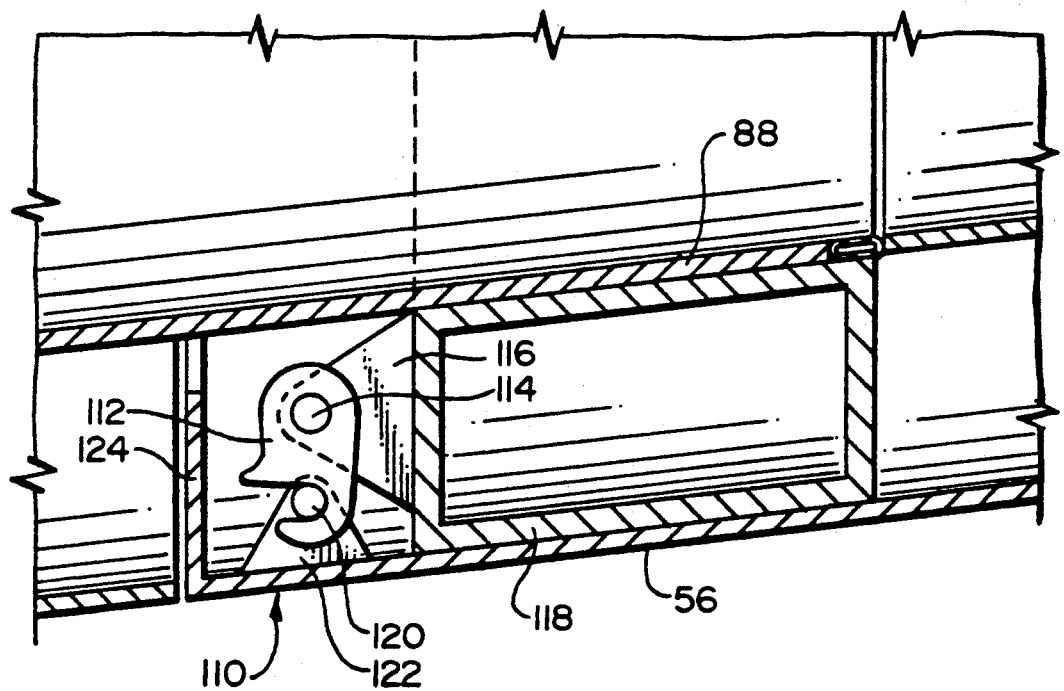
FIG. 7 is a sectional view taken at the same location as in FIGS. 5 and 6, drawn to an enlarged scale, and showing a latching mechanism positioned at the forward swing end of the thrust diverting end structure.

With reference to FIG. 7, there is shown a safety latch 110 which connects the outboard forward edge portion of the end structure 40 to the fan duct structure 24. More particularly, this latch 110 comprises a latch member 112 pivotally mounted at 114 to a pair of ears 116 that are in turn fixedly attached to an annular structural member or ring 118 that is positioned around the rear end portion of the inner skin 88. This latching member 112 in its latching position engages a pin 120 that is connected by a pair of ears 122 that are in turn fixedly connected to the forward outer edge portion of the forward extension 56 of the end structure 40. Suitable actuating means are provided to move the latching member 112 between its latching position of FIG. 7 to an unlatched position to permit the movement of the end structure 40 from the cruise position to the thrust reversing position. The forward edge of the forward extension 56 is formed with an inturned lip 124 to assist in properly deflecting the flow of exhaust in the thrust reversing mode.

It is to be understood that the ring 118 can be a load carrying structural member which can be operatively attached to the pivot mounts 100 and 106 of the actuators 98 and 104, respectively, and that this ring 118 can in turn transmit these loads through suitable structure to the strut 22. In the preferred configuration, at least the thrust reversing loads exerted on the end structure 40 and the blocking plate 42 are transmitted through load carrying members in the fan duct structure 24 to the strut 22. The manner in which the thrust loads and the thrust reversing loads are carried into the airplane structure is or may be substantially the same as that described in the aforementioned parent patent application, U.S. Ser. No. 07/205,184, which is incorporated by reference and of which the present application is a continuation-in-part application.

To describe the operation of the present invention, it can be seen that in the cruise configuration, the end section 40 and the blocking plate 42 are positioned as rearward extensions of the main fan duct structure 24 so as to define the rear exhaust passageway 44. When it is desired to move the thrust reversing assembly 12 to the thrust reversing position, the latch member 112 is moved to its release position by a suitable actuating means, and initially the end structure 40 is moved by the two actuators 98 toward the thrust reversing position of FIGS. 6 and 9. At the same time, the action of the actuators 104 is coordinated so that the blocking plate 42 moves toward the deployed position.

It can readily be seen that in the thrust reversing position of FIGS. 6 and 9, the blocking plate 42 substantially closes the opening defined by the main rear 5 end portion 46 of the end structure 40. Also, the side portions of the blocking plate 42 form with rear end portions of the fan duct structure 24 and also with the forward extension 56 a barrier defining a curved trough like structure that turns and directs the exhaust (which is a mixture of the gaseous exhaust and the fan air) in a forward and laterally extending direction to cause thrust reversal. Upon completion of the thrust reversing operation, the blocking plate 42 and the end structure 40 are moved by the actuators 104 and 98 back to the cruise configuration.

It is apparent that various modifications could be made to the present invention without departing from the basic teaching thereof.

What is claimed is:

1. A jet engine and thrust reversing assembly having a longitudinal axis, a forward end and a rear end, said assembly comprising:
   a. an engine comprising an engine housing enclosing a thrust creating engine portion and having an intake end and an annular rear end portion from which exhaust is discharged into an exhaust area, said housing having an outer circumferential aerodynamic surface extending substantially entirely around said housing and extending lengthwise from said intake end to a rear end of said rear end portion;

b. a thrust reversing subassembly having a cruise position and a thrust reversing position, and comprising:

i. an annular thrust diverting structure comprising a rear portion of said engine housing and further comprising a circumferential side wall which has an outer circumferential surface extending substantially entirely around said thrust diverting structure so that in the cruise position the outer circumferential surface of the thrust diverting structure forms substantially an entire rear circumferential portion of the outer circumferential aerodynamic surface if the engine housing, with a forward annular end portion of said thrust diverting structure being positioned adjacent to a rear end portion of a forward main housing section of said engine housing so as to form a rearward extension of said main housing section and to define a rear exhaust passageway portion from which the exhaust is discharged, said thrust diverting structure being pivotally movable about a pivot location from the cruise position to the thrust reversing position where a portion of the forward end portion of the thrust diverting structure is spaced rearwardly from the rear end portion of the main housing section to form a transversely directed thrust diverting opening; and ii. passageway blocking plate means mounted to said assembly and which in the cruise positions is positioned adjacent to said engine housing, and being movable angularly to the thrust reversing position, where the blocking plate means has a forwardly facing concave surface which defines a trough extending toward said thrust diverting opening and which substantially blocks said rear exhaust passageway portion, in a manner that said exhaust is directed laterally and forwardly through said thrust diverting opening.

2. The assembly as recited in claim 1, wherein said plate means has a rear edge portion which, when the plate means is moving from the cruise position to the thrust reversing position, moves from a location adjacent to a side of said thrust diverting structure opposite to said pivot location to an opposite side of said thrust diverting structure.

3. The assembly as recited in claim 2, wherein said thrust diverting structure comprises a main rear end portion which is annular, and also a forward extension portion which extends forwardly from said main rear end portion and in the thrust reversing position extends in a lateral and forward direction to provide a trough-like extension of said blocking plate means to assist in directing said exhaust laterally and forwardly.

4. The assembly as recited in claim 3, wherein said plate means is pivotally mounted in said assembly.

5. The assembly as recited in claim 4, wherein said plate means is pivotally mounted to said jet engine.

6. The assembly as recited in claim 5 wherein said plate means is pivotally mounted to said main engine housing section.

7. The assembly as recited in claim 1, wherein said thrust diverting structure comprises a main rear end portion which is annular, and also a forward extension portion which extends forwardly from said main rear end portion and in the thrust reversing position extends in a lateral and forward direction to provide a trough-like extension of said blocking plate means to assist in directing said exhaust laterally and forwardly.

8. The assembly as recited in claim 7, wherein said forward extension portion extends adjacent said engine housing at a location which is positioned on a side of said engine housing which is opposite to the pivot location of the thrust diverting structure.

9. The assembly as recited in claim 8, wherein said plate means is pivotally mounted in said assembly.

10. The assembly as recited in claim 9, wherein said plate means is pivotally mounted to said jet engine.

11. The assembly as recited in claim 10, wherein said plate means is pivotally mounted to said main engine housing section.

12. The assembly as recited in claim 1, wherein said thrust diverting structure is mounted for pivot movement about a vertical axis and said thrust diverting opening is directed generally horizontally in a forward direction.

13. The assembly as recited in claim 12, wherein the plate means is pivotally mounted about a vertical axis.

14. A jet engine and thrust reversing assembly having a forward end and a rear end, said assembly comprising:

a. a core engine having an intake end and an exhaust and from which primary exhaust is discharged into an exhaust area;

b. a fan duct structure having an annular rear end portion and defining and annular secondary air passageway which is positioned around the core engine and which exhausts secondary air into said exhaust area, said fan duct structure having an outer circumferential aerodynamic surface extending substantially entirely around said fan duct structure and extending lengthwise from a forward end of said fan duct structure to the rear end portion of the fan duct structure;

c. fan means to blow fan air through said secondary air passageway;

d. a thrust reversing subassembly having a cruise position and a thrust reversing position and comprising:

i. an annular thrust diverting structure comprising a rear portion of said fan duct structure and further comprising a circumferential side wall which has an outer circumferential surface extending substantially entirely around said thrust diverting structure so that in the cruise position the outer circumferential surface of the thrust diverting structure forms substantially an entire rear circumferential portion of the outer circumferential aerodynamic surface of the fan duct structure, with a forward annular end portion of said thrust diverting structure being positioned adjacent to a rear end portion of a forward main fan duct structure section of the fan duct structure, so as to form a rearward extension of said main fan duct structure section and to define a rear exhaust passageway portion from which the primary exhaust and the air from the secondary passageway are discharged, said thrust diverting structure being pivotally movable rearwardly about a pivot location from the cruise position to the thrust reversing position where a portion of the forward end portion of the thrust diverting structure is spaced rearwardly from a rear end portion of the main fan duct structure section to form a laterally directed thrust diverting opening; and ii. passageway blocking plate means which is mounted to said assembly and in the cruise position is positioned adjacent to said engine housing, and being movable angularly to the thrust reversing position, where the blocking plate means has a forwardly facing concave surface which defines a trough extending toward said thrust diverting opening and which substantially blocks said rear exhaust passageway portion, in a manner that said exhaust is directed laterally and forwardly through said thrust diverting opening.

15. The assembly as recited in claim 14, wherein said plate means has a first edge portion which, when the plate means is moving from the cruise position to the thrust reversing position, moves from a location adjacent to one side of said thrust diverting structure to an opposite side of said thrust diverting structure; and said first edge portion is, in the cruise configuration, a rear edge portion of said plate means.

16. The assembly as recited in claim 15, wherein said plate means has a forward edge portion which in the thrust reversing position is positioned adjacent to said thrust diverting structure at a location opposite to said opposite side of the thrust diverting structure.

17. The assembly as recited in claim 16, wherein said thrust diverting structure comprises a main rear end portion which is annular, and also a forward extension portion which extends forwardly from said main rear end portion and in the thrust reversing position extends in a lateral and forward direction to direct said exhaust in a lateral and forward direction.

18. The assembly as recited in claim 17, wherein said plate means is pivotally mounted in said assembly.

19. The assembly as recited in claim 18, wherein said plate means is pivotally mounted to said fan duct structure.

20. The assembly as recited in claim 14, wherein said thrust diverting structure comprises a main rear end portion which is annular, and also a forward extension portion which extends forwardly from said main rear end portion and in the thrust reversing position extends in a lateral and forward direction to direct said exhaust in a lateral and forward direction.

21. The assembly as recited in claim 20, wherein said forward extension portion extends adjacent said fan duct structure at a location which is positioned on a side of said fan duct structure which is opposite to the pivot location of the thrust diverting structure.

22. The assembly as recited in claim 21, wherein the forward extension portion has in transverse section an inside surface having a concave configuration, so that in the thrust reversing position, the plate means and the forward extension portion form a trough-like configuration to direct said exhaust.

23. The assembly as recited in claim 21, wherein said plate means is pivotally mounted in said assembly.

24. The assembly as recited in claim 22, wherein said plate means is pivotally mounted to said fan duct structure.

25. The assembly as recited in claim 14, wherein the thrust diverting structure has in transverse section an inside surface having a concave configuration, so that in the thrust reversing position, the plate means and the thrust diverting portion form a trough-like configuration to direct said exhaust.

26. The assembly as recited in claim 25, wherein said plate means is pivotally mounted in said assembly.

27. The assembly as recited in claim 25, wherein said plate means is pivotally mounted to said fan duct structure.

28. The assembly as recited in claim 14, wherein said thrust diverting structure is mounted for pivot movement about a vertical axis and said thrust diverting opening is directed generally horizontally in a forward direction.

29. The assembly as recited in claim 28, wherein the plate means is pivotally mounted about a vertical axis.

30. A method of reversing thrust of a jet engine having a longitudinal axis, a forward end and rear end, said method comprising:

a. providing an engine comprising an engine housing enclosing a thrust creating engine portion and having an intake end and an annular rear end portion from which exhaust is discharged into an exhaust area, said housing having an outer circumferential aerodynamic surface extending substantially entirely around said housing and extending lengthwise from said intake end to a rear end of said rear end portion;

b. providing a thrust reversing subassembly having a cruise position and a thrust reversing position, and comprising:

i. an annular thrust diverting structure comprising a rear portion of said engine housing and further comprising a circumferential side wall which has an outer circumferential surface extending substantially entirely around said thrust diverting structure so that in the cruise position the outer circumferential surface of the thrust diverting structure forms substantially an entire rear circumferential portion of the outer circumferential aerodynamic surface of the engine housing, with a forward annular end portion of said thrust diverting structure being positioned adjacent to a rear end portion of a forward main housing section of said engine housing so as to form a rearward extension of said main housing section and to define a rear exhaust passageway portion from which the exhaust is discharged.

ii. passageway blocking plate means which is mounted to said assembly and in the cruise positions is positioned adjacent to said engine housing, c. moving said thrust diverting structure about a pivot location from the cruise position to the thrust reversing position where a portion of the forward end portion of the thrust diverting structure is spaced rearwardly from the rear end portion of the main housing section to form a transversely directed thrust diverting opening; and d. moving said plate angularly means to the thrust reversing position, where the blocking plate means has a forwardly facing concave surface which defines a trough extending toward said thrust diverting opening to substantially block said rear exhaust passageway portion, and to direct said exhaust in a direction laterally and forwardly through said thrust diverting opening.

31. The method as recited in claim 30, wherein said plate means has a rear edge portion, said method further comprising moving the plate means from the cruise position to the thrust reversing position in a manner that the rear edge portion moves from a location adjacent to a side of said thrust diverting structure opposite to said pivot location to an opposite side of said thrust diverting structure.

32. The assembly as recited in claim 31, further comprising providing said thrust diverting structure with a main rear end portion which is annular, and also a forward extension portion which extends forwardly from said main rear end portion, and in the thrust reversing position locating said forward extension in a lateral and forward direction to provide a trough-like extension of said blocking plate means to assist in directing said exhaust laterally and forwardly.

33. The assembly as recited in claim 30, further comprising providing said thrust diverting structure with a main rear end portion which is annular, and also a forward extension portion which extends forwardly from said main rear end portion, and in the thrust reversing position locating said forward extension in a lateral and forward direction to provide a trough-like extension of said blocking plate means to assist in directing said exhaust laterally and forwardly.

* * * * *